(12) United States Patent
Zhao et al.

(10) Patent No.: US 12,676,668 B2
(45) Date of Patent: Jul. 7, 2026

(54) CROSS-BAND PASSIVE BACKSCATTER CIRCUIT

(71) Applicant: ZHEJIANG UNIVERSITY, Zhejiang (CN)

(72) Inventors: Bo Zhao, Zhejiang (CN); Junhong Sun, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 39 days.

(21) Appl. No.: 19/012,785

(22) Filed: Jan. 7, 2025

(65) Prior Publication Data

US 2025/0379650 A1    Dec. 11, 2025

(30) Foreign Application Priority Data

Jun. 7, 2024    (CN) .......................... 202410734678.6

(51) Int. Cl.
*H04B 7/22*          (2006.01)
*H04B 1/40*          (2015.01)
(52) U.S. Cl.
CPC ................. *H04B 7/22* (2013.01); *H04B 1/40* (2013.01)
(58) Field of Classification Search
CPC .............. H04B 1/40; H04B 7/22; H04W 4/30
See application file for complete search history.

(56) References Cited

U.S. PATENT DOCUMENTS

| | | | | |
|---|---|---|---|---|
| 10,873,363 B2 * | 12/2020 | Gollakota | .............. | H04B 1/713 |
| 12,519,341 B2 * | 1/2026 | Patchava | .............. | H02J 50/001 |
| 12,542,580 B2 * | 2/2026 | Kumar | ................. | H04B 7/0426 |
| 2021/0250868 A1 * | 8/2021 | Ma | ........................... | H04B 1/38 |

* cited by examiner

*Primary Examiner* — Dac V Ha

(74) *Attorney, Agent, or Firm* — JCIPRNET

(57)          ABSTRACT

Disclosed in the present disclosure is a cross-band passive backscatter circuit, which belongs to the technical field of radio frequency transceivers. The cross-band passive backscatter circuit includes: an uplink including an input radio frequency antenna, a matching network, a carrier enhancement circuit, a carrier frequency division circuit, a cross-frequency backscatter module, a digital baseband, and an output reflection antenna; a power management unit including a rectifier, a bandgap reference, and a linear voltage regulator; and a downlink including a downlink demodulation circuit. In the present disclosure, frequency division output of a high-frequency carrier obtained by an on-chip low-power frequency divider and a high-frequency carrier are utilized to complete cross-band higher-frequency backscatter. Compared with a traditional cross-band communication technology, the design of a multi-band local oscillator is avoided, cross-band backscatter communication is directly realized, and power consumption and hardware overhead are reduced.

10 Claims, 5 Drawing Sheets

CROSS-BAND PASSIVE BACKSCATTER CIRCUIT

CROSS-REFERENCE TO RELATED APPLICATION

This application claims the priority benefit of China application serial no. 202410734678.6, filed on Jun. 7, 2024. The entirety of the above-mentioned patent application is hereby incorporated by reference herein and made a part of this specification.

TECHNICAL FIELD

The present disclosure belongs to the technical field of radio frequency transceivers, and particularly relates to a cross-band passive backscatter circuit.

BACKGROUND

Cross-band communication is an inevitable problem in design of a radio frequency transceiver system. Due to the increasingly complicated frequency band expansion and various newly added protocols, different communication protocols often occupy different frequency bands, and when different protocols are needed to exchange information or upload data, two sets transceiver systems must be designed, which brings huge hardware overhead and power consumption, and shortens standby time of the system.

Furthermore, most of the current node sensors of the Internet of Things are active, that is, button batteries or other small batteries are used for providing energy for the system. Today, with the rapid growth of Internet of Things nodes, the problem that must be faced in the future is replacement of batteries. Passive sensor nodes supply power to the system through radio frequency energy of a router, which solves the problem of battery replacement.

SUMMARY

An objective of the present disclosure is to provide a cross-band passive backscatter circuit, so as to solve the above technical problems.

In order to solve the above technical problems, specific technical solutions of a cross-band passive backscatter circuit provided by the present disclosure are as follows:

A cross-band passive backscatter circuit includes:

an antenna_F1, where an input of the antenna_F1 is a radio frequency signal RF1 of a router, and outputs of the antenna_F1 are differential radio frequency inputs RF_N and RF_P respectively;

a matching network, where inputs of the matching network are a radio frequency input RF_N and a radio frequency input RF_P respectively, and outputs of the matching network are a radio frequency input signal RFIN_N and a radio frequency input signal RFIN_P respectively;

a rectifier, where inputs of the rectifier are a radio frequency input signal RFIN_N and a radio frequency input signal RFIN_P respectively, and outputs of the rectifier are a rectified output VDC_OUT and a rectifier first-stage output VDC_DATA respectively;

a bandgap reference, where an input of the bandgap reference is the rectified output VDC_OUT, and an output of the bandgap reference is a bandgap reference voltage VBG;

a linear voltage regulator, where inputs of the linear voltage regulator are the rectified output VDC_OUT and the bandgap reference voltage VBG respectively, and an output of the linear voltage regulator is system power supply VDC_SYS;

a downlink demodulation link, where an input of the downlink demodulation link is the rectifier first-stage output VDC_DATA, and an output of the downlink demodulation link is downlink baseband data DL_DATA;

a carrier enhancement, where an input of the carrier enhancement is the radio frequency input signal RFIN_N, and outputs of the carrier enhancement are a direct reflection carrier RFIN_BS and a carrier frequency division input RFIN_EN respectively;

a carrier frequency division, where an input of the carrier frequency division is a carrier frequency division input RFIN_EN, and an output of the carrier frequency division is a carrier frequency division output RFIN_DIV;

a digital baseband, where an output of the digital baseband is a reflected baseband signal UL_DATA;

a cross-frequency backscatter, where inputs of the cross-frequency backscatter are the carrier frequency division output RFIN_DIV, the direct reflection carrier RFIN_BS, and the reflected baseband signal UL_DATA respectively, and outputs of the cross-frequency backscatter are a radio frequency output RF_OUT_N and a radio frequency output RF_OUT_P respectively;

an antenna_F2, where inputs of the antenna_F2 are the radio frequency output RF_OUT_N and the radio frequency output RF_OUT_P respectively, and outputs of the antenna_F2 is a radio frequency output RF2; and the router, where an input of the router is the radio frequency output RF2 received via an antenna_F22, and an output of the router is the radio frequency signal RF1 transmitted via an antenna_F11.

Further, the antenna_F1 includes a single-ended input differential output module for receiving the radio frequency signal RF1 transmitted by the antenna_F11 of the router and outputting differential radio frequency signal radio inputs RF_N and RF_P.

Further, the matching network includes two tuning capacitors C21 and C22, and a radio frequency front-end including the rectifier is ensured to work at the frequency of the radio frequency signal RF1 by adjusting values of C21 and C22, and the values of C21 and C22 are identical. One end of C21 is connected to the radio frequency input signal RFIN_N, and the other end of C21 is connected to a node GND. One end of C22 is connected to the radio frequency input signal RFIN_P, and the other end of C22 is connected to the node GND.

Further, the rectifier further includes:

three rectifier units: a rectifier 1, a rectifier 2, and a rectifier 3, where the three rectifier units are identical, connected in series according to the sequence of the rectifier 1, the rectifier 2, and the rectifier 3, and used for rectifying sine waves of high-frequency radio frequency signals into direct current signals step by step.

Inputs of the rectifier 1 are nodes REC_3 and REC_4 respectively, and an output of the rectifier 1 is the rectifier first-stage output VDC_DATA.

Inputs of the rectifier 2 are the rectifier first-stage output VDC_DATA, nodes REC_5 and REC_6 respectively, and an output of the rectifier 2 is a rectified output node VDC_0.

Inputs of the rectifier 3 are rectified output nodes VDC_0, REC_7 and REC_8, and an output of the rectifier 3 is the rectified output VDC_OUT.

Six alternating current coupling capacitors C23, C24, C25, C26, C27, and C28, where the six capacitors are identical, and capacitance values of the six capacitors depend on the frequency of the radio frequency signal RF1 to ensure that existence of the capacitors will not have a greater impact on the radio frequency signal.

For the two first-stage alternating current coupling capacitors C23 and C24, one end of C23 is connected to the radio frequency input signal RFIN_N, the other end of C23 is connected to the node REC_3, one end of C24 is connected to the radio frequency input signal RFIN_P, and the other end of the C24 is connected to the node REC_4.

For the two second-stage alternating current coupling capacitors C25 and C26, one end of C25 is connected to the radio frequency input signal RFIN_N, the other end of C25 is connected to the node REC_5, one end of C26 is connected to the radio frequency input signal RFIN_P, and the other end of C26 is connected to the node REC_6.

For the two third-stage alternating current coupling capacitors C27 and C28, one end of C27 is connected to the radio frequency input signal RFIN_N, the other end of C27 is connected to the node REC_7, one end of C28 is connected to the radio frequency input signal RFIN_P, and the other end of C28 is connected to the node REC_8.

A filter capacitor C29, where the function of the filter capacitor C29 is to filter out ripples of the rectifier output, C29 is realized by on-chip Decap, one end of the filter capacitor C29 is connected to the rectified output VDC_OUT, and the other end of C29 is connected to the node GND.

Further, the bandgap reference includes an on-chip reference circuit having a zero temperature coefficient and is independent of a supply voltage, providing a reference voltage and a reference current for the system, the input of the bandgap reference is the rectified output VDC_OUT fluctuating within a certain range, certain high frequency noise and rectified noise exist, and the output of the bandgap reference is the bandgap reference voltage VBG. The linear voltage regulator includes a voltage regulator capable of providing a driving current, a driving voltage of the voltage regulator is the bandgap reference voltage VBG of the bandgap reference input, the linear voltage regulator is powered by the rectified output VDC_OUT, and the linear voltage regulator has a power interference rejection capability.

Further, the downlink demodulation link includes:
two low-pass filters 1 and 2 with different cut-off frequencies, where the purpose of the low-pass filter 1 is to obtain a downlink common-mode point VDC_DATA_CM of the rectifier first-stage output VDC_DATA as a reference voltage of a comparator. The function of the low-pass filter 2 is to filter out the radio frequency signal RF1 in the rectifier first-stage output VDC_DATA, but to retain modulated data, and the cut-off frequency is greater than a modulated data rate.

An input of the low-pass filter 1 is the rectifier first-stage output VDC_DATA, and an output of the low-pass filter 1 is the downlink common-mode point VDC_DATA_CM.

An input of the low-pass filter 2 is the rectifier first-stage output VDC_DATA, and an output of the low-pass filter 2 is a downlink data input VDC_DATA_IN.

The comparator, where the function is to obtain a final output of the downlink demodulation link, i.e. the downlink baseband data DL_DATA, by comparing a voltage difference between the downlink common-mode point VDC_DATA_CM and the downlink data input VDC_DATA_IN.

Inputs of the comparator are the downlink common-mode point VDC_DATA_CM and the downlink data input VDC_DATA_IN respectively, and an output of the comparator is the downlink baseband data DL_DATA.

Further, the carrier enhancement includes:
four inverting amplifiers I1, I2, I3, and I4, amplifying the radio frequency input signal RFIN_N into a rail-to-rail signal direct reflection carrier RFIN_BS and a carrier frequency division input RFIN_EN by utilizing a large gain under the situation that an input and an output of an inverter are both stabilized at VDD/2, where the direct reflection carrier RFIN_BS serves as the input of the cross-frequency backscatter, and the carrier frequency division input RFIN_EN serves as the input of the carrier frequency division.

An input of the first-stage inverting amplifier I1 is a node RFIN_AC, and an output of the first-stage inverting amplifier I1 is a node RFIN S1.

A self-biasing resistor R1 is connected in parallel with the first-stage inverting amplifier I1, an input of the self-biasing resistor R1 is a node RFIN_AC, and an output of the self-biasing resistor R1 is the node RFIN S1.

An input of the second-stage inverting amplifier I2 is the node RFIN_S1, and an output of the second-stage inverting amplifier I2 is a node RFIN S2.

An input of the third-stage inverting amplifier I3 is the node RFIN_S2, and an output of the third-stage inverting amplifier I3 is the direct reflection carrier RFIN_BS.

An input of the fourth-stage inverting amplifier I4 is the direct reflection carrier RFIN_BS, and an output of the fourth-stage inverting amplifier I4 is the carrier frequency division input RFIN_EN.

An alternating current coupling capacitor C1 for achieving alternating current signal transmission with loss as little loss as possible.

An input of the alternating current coupling capacitor C1 is the radio frequency input signal RFIN_N, and an output of the alternating current coupling capacitor C1 is a node RFIN_AC.

The self-biasing resistor R1, used for biasing the input and the output of the first-stage inverting amplifier I1 at VDD/2 to achieve the maximum gain of the inverting amplifier.

Further, the digital baseband includes: a digital module, a digital code written using Verilog, and a layout module generated using a digital synthesis tool and a layout tool.

Further, the cross-frequency backscatter includes:
a backscatter circuit, where inputs of the backscatter circuit are the carrier frequency division output RFIN_DIV, the direct reflection carrier RFIN_BS and the reflected baseband signal UL_DATA respectively, addition and subtraction or nonlinear operation of the three inputs and the radio frequency signal RF1 are realized in a backscatter process, and outputs of the backscatter circuit are the radio frequency output RF_OUT_N and the radio frequency output RF_OUT_P respectively.

Further, the antenna_F2 includes a differential antenna, the nonlinear operation is implemented by using nonlinearity of the antenna_F2 and the cross-frequency backscatter, inputs of the differential antenna are the radio frequency output RF_OUT_N and a radio frequency output RF_OUT_P respectively, and an output of the differential antenna is the radio frequency output RF2.

The router includes a dual-frequency duplex router, an input of the dual-frequency duplex router is the radio frequency output RF2 received via the antenna_F22, and an output of the dual-frequency duplex router is the radio frequency signal RF1 transmitted via the antenna_F11.

According to the present disclosure, the cross-band passive backscatter circuit has the advantages as follows: compared with the design difficulty of a multi-band signal link which is difficult to avoid in a traditional cross-band communication system, the cross-band passive backscatter circuit is used for realizing low-power consumption cross-band communication, and the design of an energy collection system can help realize full passivity of an Internet of Things device.

DETAILED DESCRIPTIONS OF THE EMBODIMENTS

In order to better understand the objective, structure and function of the present disclosure, a cross-band passive backscatter circuit of the present disclosure is further described in detail below in conjunction with the accompanying drawings.

Figure 1:
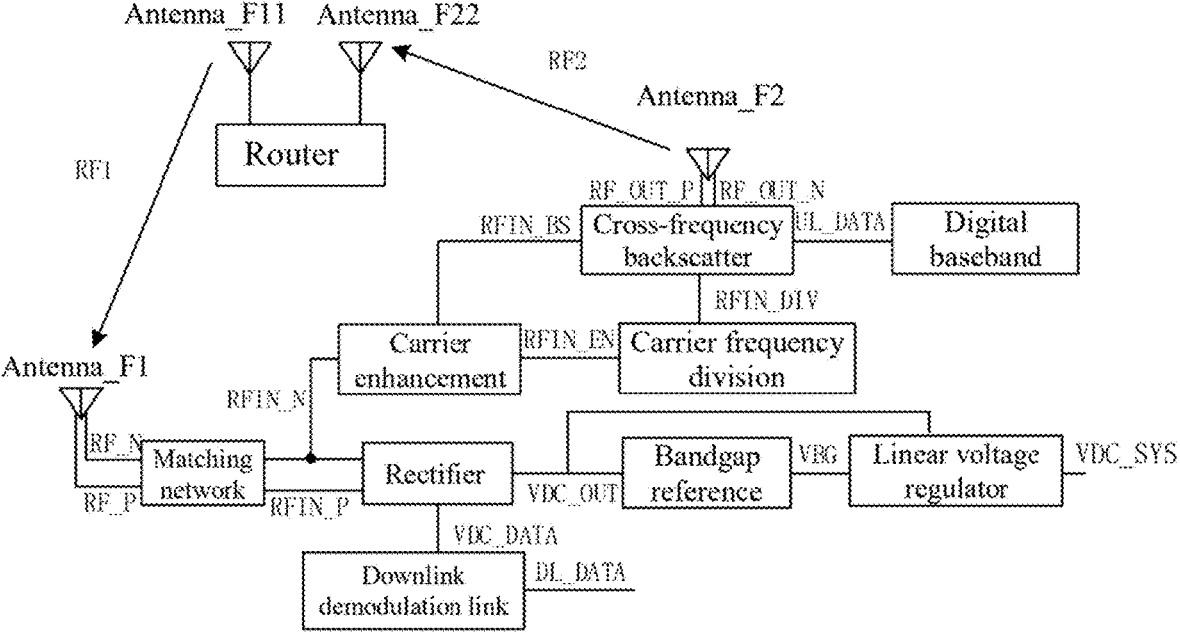
FIG. 1 is an integral block diagram of the present disclosure.

As shown in FIG. 1, a cross-band passive backscatter circuit of the present disclosure includes:

an antenna_F1, where an input of the antenna_F1 is a radio frequency signal RF1 of a router, and outputs of the antenna_F1 are differential radio frequency inputs RF_N and RF_P respectively;

a matching network, where inputs of the matching network are a radio frequency input RF_N and a radio frequency input RF_P respectively, and outputs of the matching network are a radio frequency input signal RFIN_N and a radio frequency input signal RFIN_P respectively;

a rectifier, where inputs of the rectifier are a radio frequency input signal RFIN_N and a radio frequency input signal RFIN_P respectively, and outputs of the rectifier are a rectified output VDC_OUT and a rectifier first-stage output VDC_DATA respectively;

a bandgap reference, where an input of the bandgap reference is the rectified output VDC_OUT, and an output of the bandgap reference is a bandgap reference voltage VBG;

a linear voltage regulator, where inputs of the linear voltage regulator are the rectified output VDC_OUT and the bandgap reference voltage VBG respectively, and an output of the linear voltage regulator is system power supply VDC_SYS;

a downlink demodulation link, where an input of the downlink demodulation link is the rectifier first-stage output VDC_DATA, and an output of the downlink demodulation link is downlink baseband data DL_DATA;

a carrier enhancement, where an input of the carrier enhancement is the radio frequency input signal RFIN_N, and outputs of the carrier enhancement are a direct reflection carrier RFIN_BS and a carrier frequency division input RFIN_EN respectively;

a carrier frequency division, where an input of the carrier frequency division is a carrier frequency division input RFIN_EN, and an output of the carrier frequency division is a carrier frequency division output RFIN_DIV;

a digital baseband, where an output of the digital baseband is a reflected baseband signal UL_DATA;

a cross-frequency backscatter, where inputs of the cross-frequency backscatter are the carrier frequency division output RFIN_DIV, the direct reflection carrier RFIN_BS, and the reflected baseband signal UL_DATA respectively, and outputs of the cross-frequency backscatter are a radio frequency output RF_OUT_N and a radio frequency output RF_OUT_P respectively;

an antenna_F2, where inputs of the antenna_F2 are the radio frequency output RF_OUT_N and the radio frequency output RF_OUT_P respectively, and outputs of the antenna_F2 is a radio frequency output RF2; and the router, where an input of the router is the radio frequency output RF2 received via an antenna_F22, and an output of the router is the radio frequency signal RF1 transmitted via an antenna_F11.

As shown in FIG. 1, the antenna_F1 includes:

a single-ended input differential output module for receiving the radio frequency signal RF1 transmitted by the antenna_F11 of the router and outputting differential radio frequency signal radio frequency inputs RF_N and RF_P.

Figure 2:
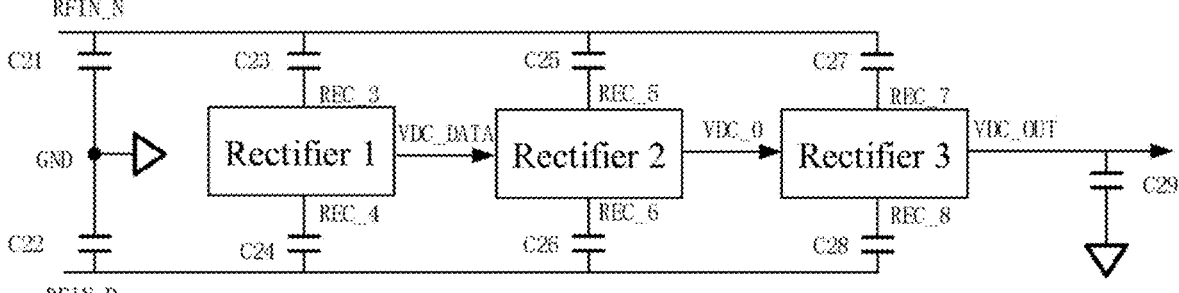
FIG. 2 is a circuit diagram of a rectifier in the present disclosure.

As shown in FIG. 2, the matching network includes:

two tuning capacitors C21 and C22, where a radio frequency front-end including the rectifier is ensured to work at the frequency of the radio frequency signal RF1 by adjusting values of C21 and C22, and the values of C21 and C22 are identical.

For the two tuning capacitors C21 and C22, one end of C21 is connected to the radio frequency input signal RFIN_N, and the other end of C21 is connected to a node GND. One end of C22 is connected to the radio frequency input signal RFIN_P, and the other end of C22 is connected to a node GND.

As shown in FIG. 2, the rectifier includes:

three rectifier units namely a rectifier 1, a rectifier 2, and a rectifier 3, where the three rectifier units are identical, connected in series according to the sequence of the rectifier 1, the rectifier 2, and the rectifier 3, and used for rectifying sine waves of high-frequency radio frequency signals into direct current signals step by step.

Inputs of the rectifier 1 are nodes REC_3 and REC_4 respectively, and an output of the rectifier 1 is the rectifier first-stage output VDC_DATA.

Inputs of the rectifier 2 are the rectifier first-stage output VDC_DATA, nodes REC_5 and REC_6 respectively, and an output of the rectifier 2 is a rectified output node VDC_0.

Inputs of the rectifier 3 are rectified output nodes VDC_0, REC_7 and REC_8, and an output of the rectifier 3 is the rectified output VDC_OUT.

Six alternating current coupling capacitors C23, C24, C25, C26, C27, and C28, where the six capacitors are identical, and capacitance values of the six capacitors depend on the frequency of the radio frequency signal RF1 to ensure that existence of the capacitors will not have a greater impact on the radio frequency signal.

For the two first-stage alternating current coupling capacitors C23 and C24, one end of C23 is connected to the radio frequency input signal RFIN_N, the other end of C23 is connected to the node REC_3, one end of C24 is connected to the radio frequency input signal RFIN_P, and the other end of the C24 is connected to the node REC_4.

For the two second-stage alternating current coupling capacitors C25 and C26, one end of C25 is connected to the radio frequency input signal RFIN_N, the other end of C25 is connected to the node REC_5, one end of C26 is connected to the radio frequency input signal RFIN_P, and the other end of C26 is connected to the node REC_6.

For the two third-stage alternating current coupling capacitors C27 and C28, one end of C27 is connected to the radio frequency input signal RFIN_N, the other end of C27 is connected to the node REC_7, one end of C28 is connected to the radio frequency input signal RFIN_P, and the other end of C28 is connected to the node REC_8.

A filter capacitor C29, where the function of the filter capacitor C29 is to filter out ripples of the rectifier output, a capacitance value should be as large as possible to achieve a better filtering effect. Moreover, in order to ensure the system integration degree, C29 is realized by on-chip Decap.

For the filter capacitor C29, one end is connected to the rectified output VDC_OUT, and the other end is connected to the node GND.

As shown in FIG. 1, the bandgap reference includes:

an on-chip reference circuit having a zero temperature coefficient and is independent of a supply voltage, providing a reference voltage and a reference current for the system, where the input of the bandgap reference is the rectified output VDC_OUT fluctuating within a certain range, certain high frequency noise and rectified noise exist, and the output of the bandgap reference is the stable low-ripple and low-noise bandgap reference voltage VBG.

As shown in FIG. 1, the linear voltage regulator includes:

a voltage regulator capable of providing a driving current, where a driving voltage of the voltage regulator is the bandgap reference voltage VBG of the bandgap reference input. The linear voltage regulator is powered by the rectified output VDC_OUT, and since VDC_OUT has certain noise, the linear voltage regulator is required to have a power interference rejection capability.

Figure 3:
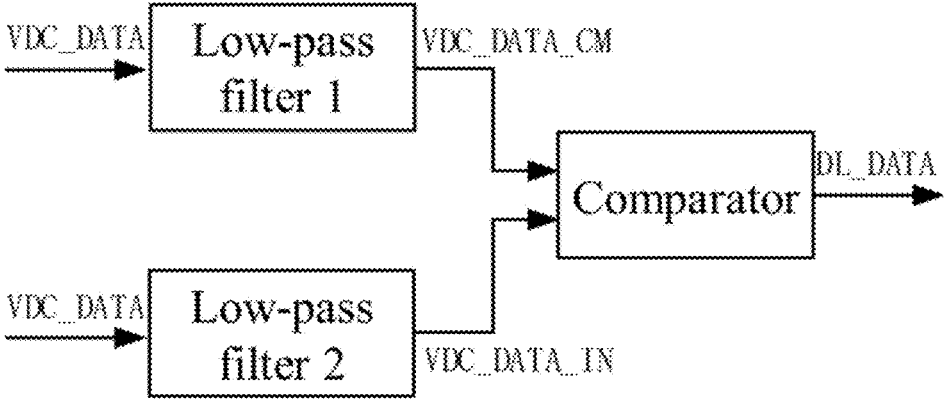
FIG. 3 is a circuit diagram of a downlink demodulation link in the present disclosure.

As shown in FIG. 3, the downlink demodulation link includes:

two low-pass filters 1 and 2 with different cut-off frequencies. The purpose of the low-pass filter 1 is to obtain a downlink common-mode point VDC_DATA_CM of the rectifier first-stage output VDC_DATA as a reference voltage of a comparator, so a bandwidth of the low-pass filter 1 should be as small as possible, and an ideal state is that only direct current signals pass. However, in view of the on-chip integration and a capacitor size, it is only necessary to satisfy that a voltage difference between the downlink common-mode point VDC_DATA_CM and the downlink data input VDC_DATA_IN is greater than the minimum determination voltage of the comparator. The function of the low-pass filter 2 is to filter out the radio frequency signal RF1 in the rectifier first-stage output VDC_DATA, but to retain modulated data, and therefore, the cut-off frequency should be greater than a modulated data rate, so as to ensure data integrity. Moreover, in order to reduce ripples, it is necessary to ensure that suppression of the radio frequency signal RF1 can avoid high-frequency ripples from causing glitches in the comparator output.

An input of the low-pass filter 1 is the rectifier first-stage output VDC_DATA, and an output of the low-pass filter 1 is the downlink common-mode point VDC_DATA_CM.

An input of the low-pass filter 2 is the rectifier first-stage output VDC_DATA, and an output of the low-pass filter 2 is a downlink data input VDC_DATA_IN.

The comparator, where the function is to obtain a final output of the downlink demodulation link, i.e. the downlink baseband data DL_DATA, by comparing a voltage difference between the downlink common-mode point VDC_DATA_CM and the downlink data input VDC_DATA_IN.

Inputs of the comparator are the downlink common-mode point VDC_DATA_CM and the downlink data input VDC_DATA_IN respectively, and an output of the comparator is the downlink baseband data DL_DATA.

Figure 4:
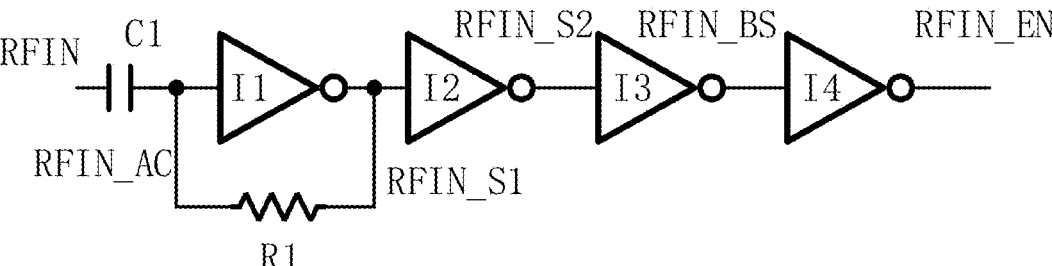
FIG. 4 is a circuit diagram of a carrier enhancement in the present disclosure.

As shown in FIG. 4, the carrier enhancement includes:

four inverting amplifiers I1, I2, I3, and I4, amplifying the radio frequency input signal RFIN_N into a rail-to-rail signal direct reflection carrier RFIN_BS and a carrier frequency division input RFIN_EN by utilizing a large gain under the situation that an input and an output of an inverter are both stabilized at VDD/2, where the direct reflection carrier RFIN_BS serves as the input of the cross-frequency backscatter, and the carrier frequency division input RFIN_EN serves as the input of the carrier frequency division.

An input of the first-stage inverting amplifier I1 is a node RFIN_AC, and an output of the first-stage inverting amplifier I1 is a node RFIN_S1.

A self-biasing resistor R1 is connected in parallel with the first-stage inverting amplifier I1, an input of the self-biasing resistor R1 is a node RFIN_AC, and an output of the self-biasing resistor R1 is the node RFIN_S1.

An input of the second-stage inverting amplifier I2 is the node RFIN_S1, and an output of the second-stage inverting amplifier I2 is a node RFIN_S2.

An input of the third-stage inverting amplifier I3 is the node RFIN_S2, and an output of the third-stage inverting amplifier I3 is the direct reflection carrier RFIN_BS.

An input of the fourth-stage inverting amplifier I4 is the direct reflection carrier RFIN_BS, and an output of the fourth-stage inverting amplifier I4 is the carrier frequency division input RFIN_EN.

An alternating current coupling capacitor C1 for achieving alternating current signal transmission with loss as little loss as possible.

An input of the alternating current coupling capacitor C1 is the radio frequency input signal RFIN_N, and an output of the alternating current coupling capacitor C1 is a node RFIN_AC.

The self-biasing resistor R1, used for biasing the input and the output of the first-stage inverting amplifier I1 at VDD/2 to achieve the maximum gain of the inverting amplifier.

As shown in FIG. 1, the digital baseband includes:

a digital module, a digital code written using Verilog, and a layout module generated using a digital synthesis tool and a layout tool.

As shown in FIG. 1, the cross-frequency backscatter includes:

a backscatter circuit, where inputs of the backscatter circuit are the carrier frequency division output RFIN_DIV, the direct reflection carrier RFIN_BS and the reflected baseband signal UL_DATA respectively. Addition and subtraction or nonlinear operation of the three inputs and the radio frequency signal RF1 are realized in a backscatter process, and outputs of the backscatter circuit are the radio frequency output RF_OUT_N and the radio frequency output RF_OUT_P respectively.

As shown in FIG. 1, the antenna_F2 includes:

a differential antenna, where the nonlinear operation is implemented by using nonlinearity of the antenna_F2 and the cross-frequency backscatter. Inputs of the differential antenna are the radio frequency output RF_OUT_N and the radio frequency output RF_OUT_P respectively, and an output of the differential antenna is the radio frequency output RF2.

As shown in FIG. 1, the router includes:

a dual-frequency duplex router, where an input of the dual-frequency duplex router is the radio frequency output RF2 received via the antenna_F22, and an output of the dual-frequency duplex router is the radio frequency signal RF1 transmitted via the antenna_F11.

The working principle of the cross-band passive backscatter circuit provided by the present disclosure is as follows:

The present disclosure is mainly divided into two units, namely an energy collection unit and a cross-band backscatter unit.

The energy collection unit converts high-frequency radio frequency signals into direct current signals through the rectifier, and the bandgap reference and the linear voltage regulator have the anti-power interference capability to weaken the influence of output ripples of the rectifier.

For the cross-band backscatter unit, enhanced a high-frequency carrier and frequency division signals are added to a traditional backscatter transistor, the size of the backscatter transistor is reasonably designed, and the nonlinearity of the antenna_F2 is utilized, such that the radio frequency signal RF1 is equivalently mixed many times, that is, the radio frequency signal RF1 is mixed with the direct reflection carrier RFIN_BS, the carrier frequency division input RFIN_EN and the reflected baseband signal UL_DATA, and backscatters the radio frequency output RF2 which is several times larger than the radio frequency signal RF1. In addition, the radio frequency output RF2 can be accurately located in the desired RF frequency band by reasonably designing a frequency division ratio of the carrier frequency division, thus achieving cross-band communication.

The carrier enhancement, carrier frequency division and cross-frequency backscatter circuits mentioned in the above process employ basic logic gate design, and time when all logic gates are in intermediate states is shortened through rail-to-rail design, thereby reducing static power consumption of the system.

EXAMPLES

Figure 5:
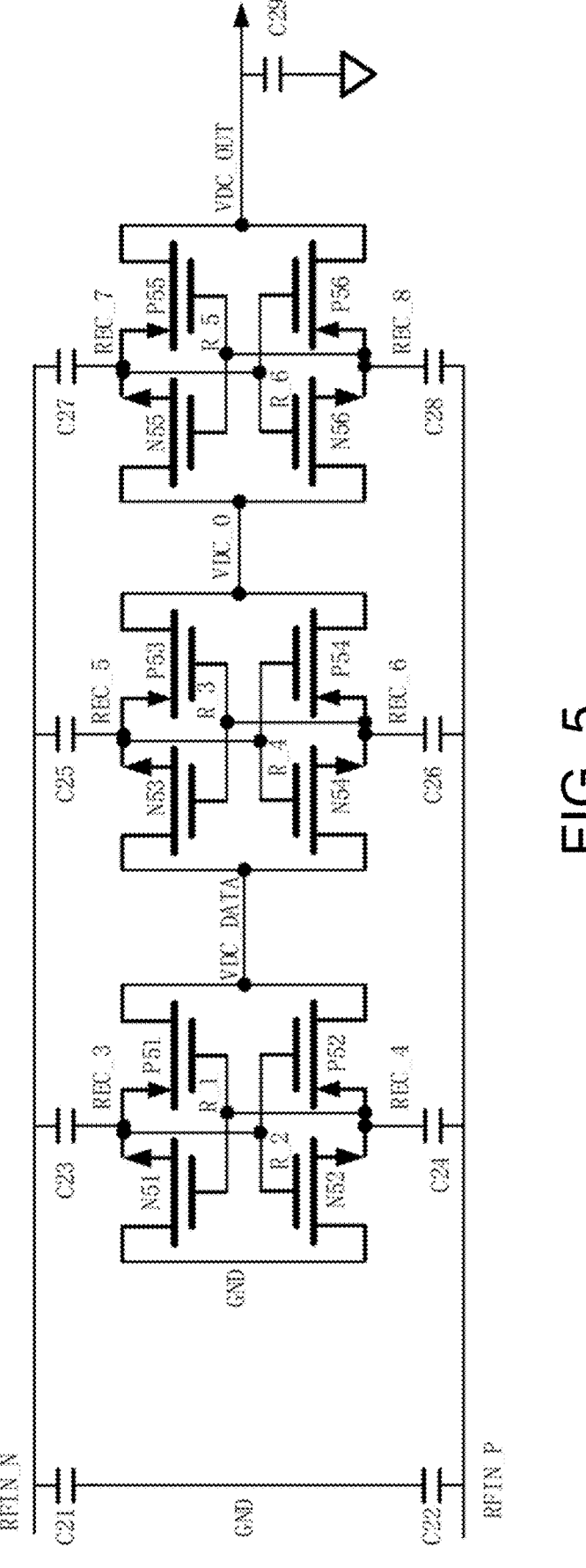
FIG. 5 is an example diagram of a rectifier in the present disclosure.

The rectifier in the example of the present disclosure is as shown in FIG. 5.

The rectifier is composed of three rectifier units namely rectifier 1, rectifier 2, and rectifier 3. The rectifier 1 is composed of two N-channel metal oxide semiconductors (NMOSs) and two P-channel metal oxide semiconductors (PMOSs), where the NMOSs are N51 and N52, and the PMOSs are P51 and P52. A gate of N51 and a gate of P51 are connected to a node R_1, a source of N52 and a source of P52 are connected to the node R_1, a gate of N52 and a gate of P52 are connected to a node R_2, and a source of N51 and a source of P51 are connected to the node R_2. Drains of N51 and N52 are connected to a node GND, and drains of P51 and P52 are connected to the rectifier first-stage output VDC_DATA. The rectifier 2 is composed of two NMOSs and two PMOSs, where the NMOSs are N53 and N54, and the PMOSs are P53 and P54. A gate of N53 and a gate of P53 are connected to a node R_3, a source of N54 and a source of P54 are connected to the node R_3, a gate of N54 and a gate of P54 are connected to a node R_4, and a source of N53 and a source of P53 are connected to the node R_4. Drains of N53 and N54 are connected to the rectifier first-stage output VDC_DATA, and drains of P53 and P54 are connected to a node VDC_0. The rectifier 3 is composed of two NMOSs and two PMOSs, where the NMOSs are N55 and N56, and the PMOSs are P55 and P56. A gate of N55 and a gate of P55 are connected to a node R_5, a source of N56 and a source of P56 are connected to the node R_5, a gate of N56 and a gate of P56 are connected to a node R_6, and a source of N55 and a source of P55 are connected to the node R_6. Drains of N55 and N56 are connected to the node VDC0, and drains of P55 and P56 are connected to the rectified output VDC_OUT.

The tuning capacitors C21 and C22 in the matching network are connected as described above and shown in the figure, which is not repeated here.

The filter capacitor C29 is connected as described above and shown in the figure, which is not repeated here.

Figure 6:
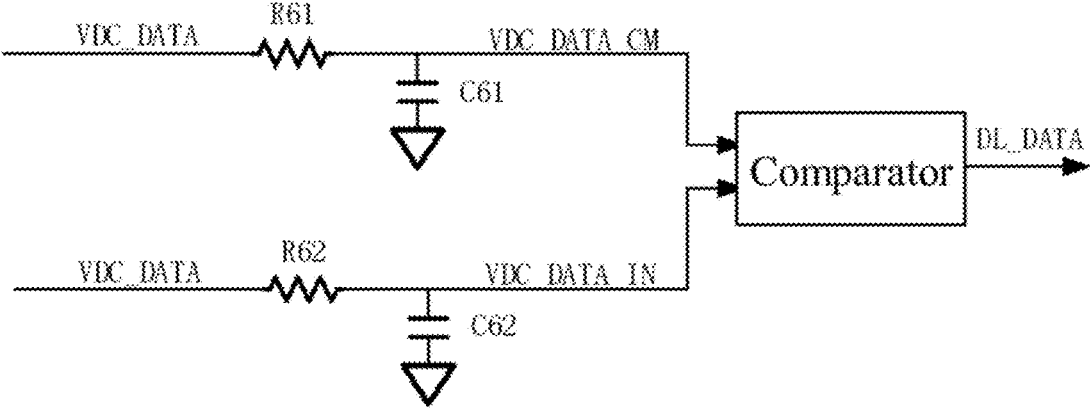
FIG. 6 is an example diagram of a downlink demodulation link in the present disclosure.

The downlink demodulation link circuit in the example of the present disclosure is as shown in FIG. 6.

The low-pass filter 1 and the low-pass filter 2 are both realized by RC low-pass filters. The low-pass filter 1 is composed of a resistor R61 and a capacitor C61, and a low-pass −3 dB bandwidth $f_{LP1/-3\ dB}$ is $$f_{LP1/-3\,dB} = 1/(2 \times pi \times R_{61} \times C_{61}) \qquad \text{(Formula 1)}$$

The output of the low-pass filter 1 is the downlink common-mode point VDC_DATA_CM, i.e. a direct current signal, and therefore, $f_{LP1/-3\ dB}$ should be as small as possible to avoid influence on a reference level of the comparator.

The low-pass filter 2 is composed of a resistor R62 and a capacitor C62, and a low-pass −3 dB bandwidth $f_{LP2/-3}$ dB is $$f_{LP2/-3\,dB} = 1/(2 \times pi \times R_{62} \times C_{62}) \qquad \text{(Formula 2)}$$

If the data rate of the downlink demodulation link is $f_{Data}$, in order to ensure that the low-pass filter 2 does not affect the demodulated data, it is required $$f_{Data} < f_{LP2/-3\,dB} \qquad \text{(Formula 3)}$$

Figure 7:
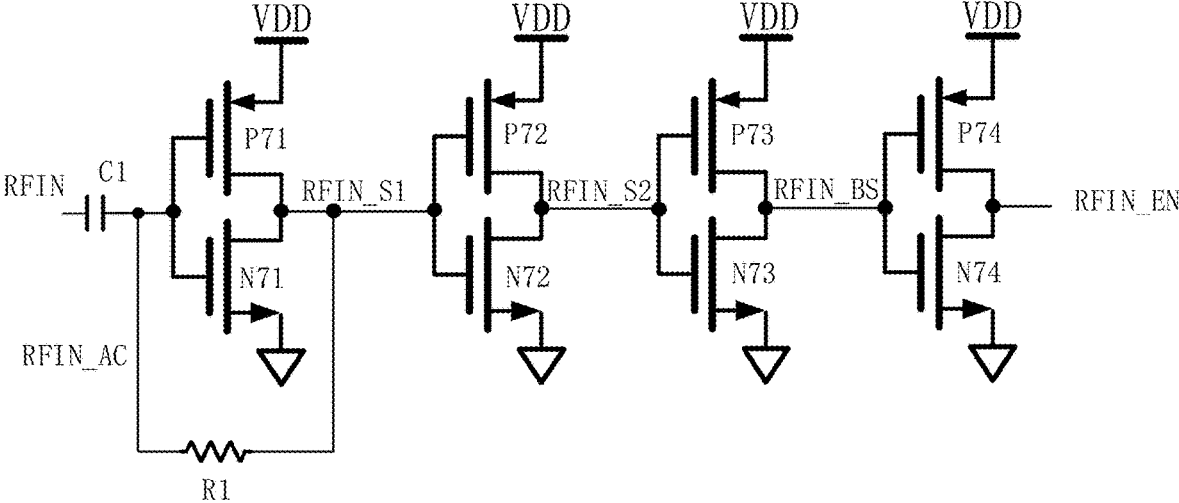
FIG. 7 is an example diagram of a carrier enhancement in the present disclosure.

The carrier enhancement circuit in the example of the present disclosure is as shown in FIG. 7.

Each of the four inverting amplifiers I1, I2, I3, and I4 each are composed of an NMOS and a PMOS. The inverting amplifier I1 is composed of P71 and N71. A source of P71 is connected to a power supply VDD, and a source of N71 is connected to the node GND. Drains of P71 and N71 are connected to the node RFIN_S1, and gates of P71 and N71 are connected to the node RFIN_AC. The inverting amplifier I2 is composed of P72 and N72. A source of P72 is connected to the power supply VDD, and a source of N72 is connected to the node GND. Drains of P72 and N72 are connected to the node RFIN_S2, and gates of P72 and N72 are connected to the node RFIN_S1. The inverting amplifier I3 is composed of P73 and N73. A source of P73 is connected to the power supply VDD, and a source of N73 is connected to the node GND. Drains of P73 and N73 are connected to the node RFIN_BS, and gates of P73 and N73 are connected to the node RFIN_S2. The inverting amplifier I4 is composed of P74 and N74. A source of P74 is connected to the power supply VDD, and a source of N74 is connected to the node GND. Drains of P74 and N74 are connected to the node RFIN_EN, and gates of P74 and N74 are connected to the node RFIN_BS.

The alternating current coupling capacitor C1 and the self-biasing resistor R1 are connected as described above and shown in the figure, which will not be repeated here.

Figure 8:
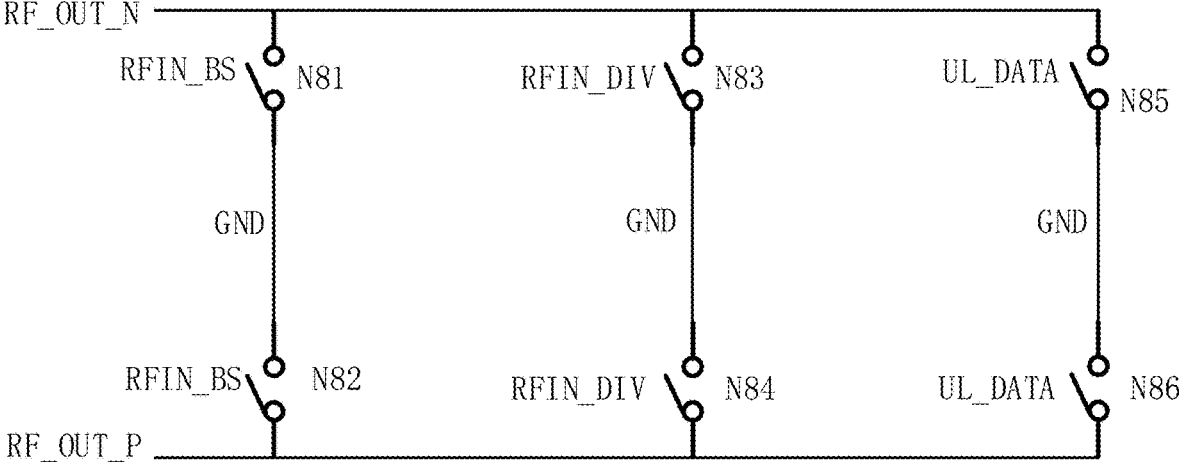
FIG. 8 is an example diagram of a cross-frequency backscatter in the present disclosure.

The cross-frequency backscatter circuit in the example of the present disclosure is as shown in FIG. 8.

Six backscatter switches N81, N82, N83, N84, N85, and N86. Switch control of N81 and N82 is connected to the node RFIN_BS, and a joint between N81 and N82 is connected to the node GND. The other end of N81 is connected to the radio frequency output RF_OUT_N, and the other end of N82 is connected to the radio frequency output RF_OUT_P. Switch control of N83 and N84 is connected to the node RFIN_DIV, and a joint between N83 and N84 is connected to the node GND. The other end of N83 is connected to the radio frequency output RF_OUT_N, and the other end of N84 is connected to the radio frequency output RF_OUT_P. Switch control of N85 and N86 is connected to the node UL_DATA, and a joint between N85 and N86 is connected to the node GND. The other end of N85 is connected to the radio frequency output RF_OUT_N, and the other end of N86 is connected to the radio frequency output RF_OUT_P. The above six backscatter switches N81, N82, N83, N84, N85, and N86 are equivalent to performing nonlinear mixing on the radio frequency signal F1 received by the antenna_F2, thereby realizing cross-band communication.

It can be understood that the present disclosure is described through some examples. Those skilled in the art will appreciate that various changes or equivalent substitutions may be made to these features and examples without departing from the spirit and scope of the present disclosure. In addition, modifications may be made under guidance of the present disclosure to these features and examples, so as to adapt a particular situation or material and will not depart from the spirit and scope of the present disclosure. Accordingly, the present disclosure is not limited to the particular examples disclosed herein, but all examples falling within the scope of the claims of this application are intended to be within the scope of protection of the present disclosure.

What is claimed is:

1. A cross-band passive backscatter circuit, comprising:

an antenna (_F1), wherein an input of the antenna (_F1) is a radio frequency signal (RF1) of a router, and outputs of the antenna (_F1) are differential radio frequency inputs (RF_N) and (RF_P) respectively;

a matching network, wherein inputs of the matching network are a radio frequency input (RF_N) and a radio frequency input (RF_P) respectively, and outputs of the matching network are a radio frequency input signal (RFIN_N) and a radio frequency input signal (RFIN_P) respectively;

a rectifier, wherein inputs of the rectifier are a radio frequency input signal (RFIN_N) and a radio frequency input signal (RFIN_P) respectively, and outputs of the rectifier are a rectified output (VDC_OUT) and a rectifier first-stage output (VDC_DATA) respectively;

a bandgap reference, wherein an input of the bandgap reference is the rectified output (VDC_OUT), and an output of the bandgap reference is a bandgap reference voltage (VBG);

a linear voltage regulator, wherein inputs of the linear voltage regulator are the rectified output (VDC_OUT) and the bandgap reference voltage (VBG) respectively, and an output of the linear voltage regulator is system power supply (VDC_SYS);

a downlink demodulation link, wherein an input of the downlink demodulation link is the rectifier first-stage output (VDC_DATA), and an output of the downlink demodulation link is downlink baseband data (DL_DATA);

a carrier enhancement, wherein an input of the carrier enhancement is the radio frequency input signal (RFIN_N), and outputs of the carrier enhancement are a direct reflection carrier (RFIN_BS) and a carrier frequency division input (RFIN_EN) respectively;

a carrier frequency division, wherein an input of the carrier frequency division is a carrier frequency division input (RFIN_EN), and an output of the carrier frequency division is a carrier frequency division output (RFIN_DIV);

a digital baseband, wherein an output of the digital baseband is a reflected baseband signal (UL_DATA);

a cross-frequency backscatter, wherein inputs of the cross-frequency backscatter are the carrier frequency division output (RFIN_DIV), the direct reflection carrier (RFIN_BS), and the reflected baseband signal (UL_DATA) respectively, and outputs of the cross-frequency backscatter are a radio frequency output (RF_OUT_N) and a radio frequency output (RF_OUT_P) respectively;

an antenna (_F2), wherein inputs of the antenna (_F2) are the radio frequency output (RF_OUT_N) and the radio frequency output (RF_OUT_P) respectively, and outputs of the antenna (_F2) is a radio frequency output (RF2); and the router, wherein an input of the router is the radio frequency output (RF2) received via an antenna (_F22), and an output of the router is the radio frequency signal (RF1) transmitted via an antenna (_F11).

2. The cross-band passive backscatter circuit according to claim 1, wherein the antenna (_F1) comprises a single-ended input differential output module for receiving the radio frequency signal (RF1) transmitted by the antenna (_F11) of the router and outputting differential radio frequency signal radio inputs (RF_N) and (RF_P).

3. The cross-band passive backscatter circuit according to claim 1, wherein the matching network comprises two tuning capacitors (C21 and C22), and a radio frequency front-end comprising the rectifier is ensured to work at the frequency of the radio frequency signal (RF1) by adjusting values of the tuning capacitors (C21 and C22), the values of the tuning capacitors (C21 and C22) are identical, one end of the tuning capacitor (C21) is connected to the radio frequency input signal (RFIN_N), the other end of the tuning capacitor (C21) is connected to a node (GND), one end of the tuning capacitor (C22) is connected to the radio frequency input signal (RFIN_P), and the other end of the tuning capacitor (C22) is connected to the node (GND).

4. The cross-band passive backscatter circuit according to claim 1, wherein the rectifier comprises:

three rectifier units: a first rectifier, a second rectifier, and a third rectifier, wherein the three rectifier units are identical, connected in series according to the sequence of the first rectifier, the second rectifier, and the third rectifier, and used for rectifying sine waves of high-frequency radio frequency signals into direct current signals step by step;

inputs of the first rectifier are nodes (REC_3 and REC_4) respectively, and an output of the first rectifier is the rectifier first-stage output (VDC_DATA);

inputs of the second rectifier are the rectifier first-stage output (VDC_DATA), nodes (REC_5 and REC_6) respectively, and an output of the second rectifier is a rectified output node (VDC_0);

inputs of the third rectifier are rectified output nodes (VDC_0, REC_7 and REC_8), and an output of the third rectifier is the rectified output (VDC_OUT);

six alternating current coupling capacitors (C23, C24, C25, C26, C27, and C28), wherein the six capacitors are identical, and capacitance values of the six capacitors depend on the frequency of the radio frequency signal (RF1) to ensure that existence of the capacitors will not have a greater impact on the radio frequency signal;

for the two first-stage alternating current coupling capacitors (C23 and C24), one end of the first-stage alternating current coupling capacitor (C23) is connected to the radio frequency input signal (RFIN_N), the other end of the first-stage alternating current coupling capacitor (C23) is connected to the node (REC_3), one end of the first-stage alternating current coupling capacitor (C24) is connected to the radio frequency input signal (RFIN_P), and the other end of the first-stage alternating current coupling capacitor (C24) is connected to the node (REC_4);

for the two second-stage alternating current coupling capacitors (C25 and C26), one end of the second-stage alternating current coupling capacitor (C25) is connected to the radio frequency input signal (RFIN_N), the other end of the second-stage alternating current coupling capacitor (C25) is connected to the node (REC_5), one end of the second-stage alternating current coupling capacitor (C26) is connected to the radio frequency input signal (RFIN_P), and the other end of the second-stage alternating current coupling capacitor (C26) is connected to the node (REC_6);

for the two third-stage alternating current coupling capacitors (C27 and C28), one end of the third-stage alternating current coupling capacitor (C27) is connected to the radio frequency input signal (RFIN_N), the other end of the third-stage alternating current coupling capacitor (C27) is connected to the node (REC_7), one end of the third-stage alternating current coupling capacitor (C28) is connected to the radio frequency input signal (RFIN_P), and the other end of the third-stage alternating current coupling capacitor (C28) is connected to the node (REC_8); and a filter capacitor (C29), wherein the function of the filter capacitor (C29) is to filter out ripples of the rectifier output, the filter capacitor (C29) is realized by on-chip Decap, one end of the filter capacitor (C29) is connected to the rectified output (VDC_OUT), and the other end of the filter capacitor (C29) is connected to the node (GND).

5. The cross-band passive backscatter circuit according to claim 1, wherein the bandgap reference comprises an on-chip reference circuit having a zero temperature coefficient and is independent of a supply voltage, providing a reference voltage and a reference current for the system, the input of the bandgap reference is the rectified output (VDC_OUT) fluctuating within a certain range, certain high frequency noise and rectified noise exist, and the output of the bandgap reference is the bandgap reference voltage (VBG); and the linear voltage regulator comprises a voltage regulator capable of providing a driving current, a driving voltage of the voltage regulator is the bandgap reference voltage (VBG) of the bandgap reference input, the linear voltage regulator is powered by the rectified output (VDC_OUT), and the linear voltage regulator has a power interference rejection capability.

6. The cross-band passive backscatter circuit according to claim 1, wherein the downlink demodulation link comprises:

first and second low-pass filters with different cut-off frequencies, wherein the purpose of the first low-pass filter is to obtain a downlink common-mode point (VDC_DATA_CM) of the rectifier first-stage output (VDC_DATA) as a reference voltage of a comparator, the function of the second low-pass filter is to filter out the radio frequency signal (RF1) in the rectifier first-stage output (VDC_DATA), but to retain modulated data, and the cut-off frequency is greater than a modulated data rate;

an input of the first low-pass filter is the rectifier first-stage output (VDC_DATA), and an output of the first low-pass filter is the downlink common-mode point (VDC_DATA_CM);

an input of the second low-pass filter is the rectifier first-stage output (VDC_DATA), and an output of the second low-pass filter is a downlink data input (VDC_DATA_IN);

the comparator, wherein the function is to obtain a final output of the downlink demodulation link, i.e. the downlink baseband data (DL_DATA), by comparing a voltage difference between the downlink common-mode point (VDC_DATA_CM) and the downlink data input (VDC_DATA_IN); and inputs of the comparator are the downlink common-mode point (VDC_DATA_CM) and the downlink data input (VDC_DATA_IN) respectively, and an output of the comparator is the downlink baseband data (DL_DATA).

7. The cross-band passive backscatter circuit according to claim 1, wherein the carrier enhancement comprises:

four inverting amplifiers (I1, I2, I3, and I4), amplifying the radio frequency input signal (RFIN_N) into a rail-to-rail signal direct reflection carrier (RFIN_BS) and a carrier frequency division input (RFIN_EN) by utilizing a large gain under the situation that an input and an output of an inverter are both stabilized at a half of a power supply voltage, wherein the direct reflection carrier (RFIN_BS) serves as the input of the cross-frequency backscatter, and the carrier frequency division input (RFIN_EN) serves as the input of the carrier frequency division;

an input of the first-stage inverting amplifier (I1) is a node (RFIN_AC), and an output of the first-stage inverting amplifier (I1) is a node (RFIN_S1);

a self-biasing resistor (R1) is connected in parallel with the first-stage inverting amplifier (I1), an input of the self-biasing resistor (R1) is a node (RFIN_AC), and an output of the self-biasing resistor (R1) is the node (RFIN_S1);

an input of the second-stage inverting amplifier (I2) is the node (RFIN_S1), and an output of the second-stage inverting amplifier (I2) is a node (RFIN_S2);

an input of the third-stage inverting amplifier (I3) is the node (RFIN_S2), and an output of the third-stage inverting amplifier (I3) is the direct reflection carrier (RFIN_BS);

an input of the fourth-stage inverting amplifier (I4) is the direct reflection carrier (RFIN_BS), and an output of the fourth-stage inverting amplifier (I4) is the carrier frequency division input (RFIN_EN);

an alternating current coupling capacitor (C1) for achieving alternating current signal transmission with loss as little loss as possible;

an input of the alternating current coupling capacitor (C1) is the radio frequency input signal (RFIN_N), and an output of the alternating current coupling capacitor (C1) is a node (RFIN_AC); and the self-biasing resistor (R1), used for biasing the input and the output of the first-stage inverting amplifier (I1) at a half of the power supply voltage to achieve the maximum gain of the inverting amplifier.

8. The cross-band passive backscatter circuit according to claim 1, wherein the digital baseband comprises: a digital module, a digital code written using Verilog, and a layout module generated using a digital synthesis tool and a layout tool.

9. The cross-band passive backscatter circuit according to claim 1, wherein the cross-frequency backscatter comprises:

a backscatter circuit, wherein inputs of the backscatter circuit are the carrier frequency division output (RFIN_DIV), the direct reflection carrier (RFIN_BS) and the reflected baseband signal (UL_DATA) respectively, addition and subtraction or nonlinear operation of the three inputs and the radio frequency signal (RF1) are realized in a backscatter process, and outputs of the backscatter circuit are the radio frequency output (RF_OUT_N) and the radio frequency output (RF_OUT_P) respectively.

10. The cross-band passive backscatter circuit according to claim 1, wherein the antenna (_F2) comprises a differential antenna, the nonlinear operation is implemented by using nonlinearity of the antenna (_F2) and the cross-frequency backscatter, inputs of the differential antenna are the radio frequency output (RF_OUT_N) and a radio frequency output (RF_OUT_P) respectively, and an output of the differential antenna is the radio frequency output (RF2); and the router comprises a dual-frequency duplex router, an input of the dual-frequency duplex router is the radio frequency output (RF2) received via the antenna (_F22), and an output of the dual-frequency duplex router is the radio frequency signal (RF1) transmitted via the antenna (_F11).

* * * * *